United States Patent
Lemmen et al.

(10) Patent No.: US 8,620,528 B2
(45) Date of Patent: Dec. 31, 2013

(54) ROLL STABILITY CONTROL AND ROLL-OVER MITIGATION BY STEERING ACTUATION

(75) Inventors: Markus Lemmen, Krefeld (DE); Dirk-Uwe Eidam, Bergisch-Gladbach Refrath (DE); Edwin Vliem, Eersel (NL); Torsten Wey, Moers (DE); Bengt Johan Henrik Jacobson, Mölnlycke (SE); Johan Hultén, Göteborg (SE)

(73) Assignee: Ford Global Technologies, Dearborn, MI (US)

( * ) Notice: Subject to any disclaimer, the term of this patent is extended or adjusted under 35 U.S.C. 154(b) by 1366 days.

(21) Appl. No.: 11/937,131

(22) Filed: Nov. 8, 2007

(65) Prior Publication Data

US 2008/0109135 A1 May 8, 2008

(30) Foreign Application Priority Data

Nov. 8, 2006 (EP) .................................... 06123661

(51) Int. Cl.
*B62D 6/00* (2006.01)
(52) U.S. Cl.
USPC .................. 701/42; 701/38; 701/41; 180/446
(58) Field of Classification Search
USPC ............. 701/38, 41, 42, 43, 45; 180/443, 446
See application file for complete search history.

(56) References Cited

U.S. PATENT DOCUMENTS

| | | | | |
|---|---|---|---|---|
| 6,091,214 A * | 7/2000 | Yamawaki et al. | ............. | 318/52 |
| 6,405,113 B1 * | 6/2002 | Yamawaki et al. | ............. | 701/41 |
| 6,496,758 B2 * | 12/2002 | Rhode et al. | ........................ | 701/1 |
| 6,637,543 B2 * | 10/2003 | Card | .............................. | 180/446 |
| 6,895,318 B1 * | 5/2005 | Barton et al. | .................... | 701/42 |
| 6,968,921 B2 * | 11/2005 | Turner et al. | ................... | 180/446 |
| 7,050,896 B2 * | 5/2006 | Tsuchiya | ......................... | 701/41 |
| 7,369,927 B2 * | 5/2008 | Hille et al. | ........................ | 701/38 |
| 7,440,844 B2 * | 10/2008 | Barta et al. | ..................... | 701/124 |
| 7,565,946 B2 * | 7/2009 | Suzumura | ...................... | 180/444 |
| 2005/0004738 A1 * | 1/2005 | Gronau et al. | ................... | 701/70 |
| 2005/0033486 A1 * | 2/2005 | Schmitt et al. | ..................... | 701/1 |
| 2005/0087389 A1 * | 4/2005 | Turner et al. | ................... | 180/446 |
| 2008/0071445 A1 * | 3/2008 | Matsubara | ....................... | 701/41 |

FOREIGN PATENT DOCUMENTS

JP       2004009812 A  *  1/2004   ............... B62D 6/00

OTHER PUBLICATIONS

Hac, Aleksander. "Influence of active chassis systems on vehicle propensity to maneuver-induced rollovers." SAE paper Jan. 2002: 0976.*

* cited by examiner

*Primary Examiner* — Thomas Black
*Assistant Examiner* — Peter D Nolan
(74) *Attorney, Agent, or Firm* — Angel M. Brunetti; Raymond L. Coppiellie (57) ABSTRACT

The invention relates to a method for reducing a risk of or avoiding a roll-over event of a vehicle, having means of an electronic controllable steering system and an electronic control unit. The electronic control unit identifies the occurrence of the roll-over risk, such that control means generate a signal in order to steer the road wheels more into the direction in which the vehicle is tending to roll-over.

16 Claims, 7 Drawing Sheets

Roll-over risk due to high friction

Roll-over risk due to loose ground

Roll-over risk due to edge

ROLL STABILITY CONTROL AND ROLL-OVER MITIGATION BY STEERING ACTUATION

TECHNICAL FIELD

The present invention relates generally to a method for reducing a roll-over event of a vehicle having an electronic controllable steering system (ECS) and an Electronic Control Unit (ECU).

Active safety functions need to be able to influence the steering system by electric control. In general, the steering degrees of freedom are steering position (angular position of the road wheels) and steering feel (hand/steering wheel torque). Both degrees of freedom can be actively controlled by appropriate actuators, which are generally referred to as ECS (Electronic Controllable Steering).

Examples of where ECS can control the steering position are Active Front Steering (AFS), Steer-by-Wire (SbW), and Rear Axle Steering (RAS). Examples of steering systems where the steering feel can be controlled are Electric Power Assisted Steering (EPAS), or combinations like AFS/SbW with EPAS. Besides EPAS, Electro Hydraulic Power Assisted Steering (EHPAS), or any other electric controlled hydraulic assist system (e.g. systems like FEPS, VAPS or eVDP) can also influence the steering torque, usually with a reduced control range compared to EPAS.

Vehicles, in particular passenger cars, can experience a rollover depending on the driver's input and the road conditions. For example, in one situation with high road friction, the driver is required to provide such a large road wheel steering angle that the vehicle rolls over. In another situation, instead of high road friction, the driver may encounter a curb, an edge on the road, or a loose ground scenario in which the tire digs itself down. These situations all have in common that roll-over occurs when high lateral forces are created on the tires. Examples for this are shown in FIG. 1.

Figure 1:
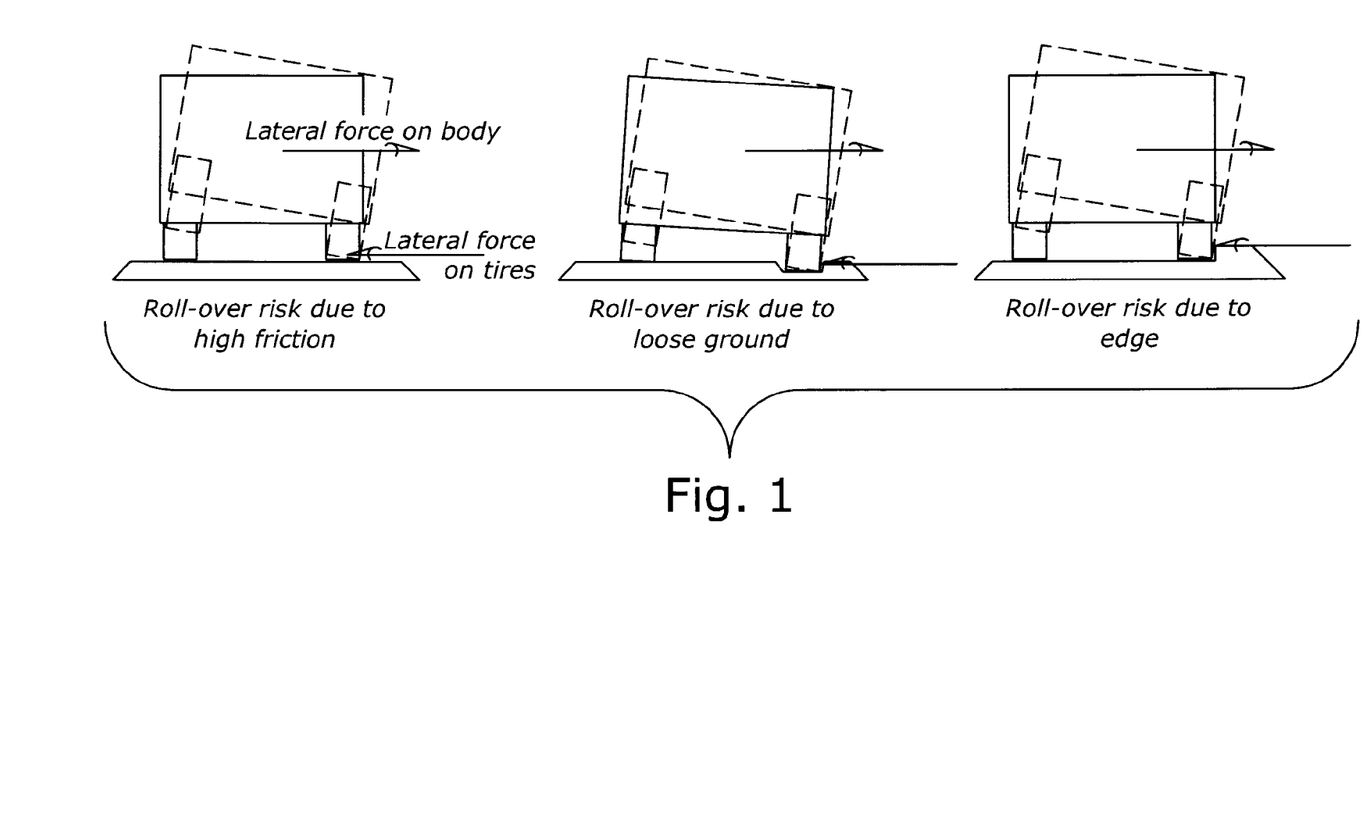
FIG. 1 is a prior art diagram of potential roll-over events.

In the left picture of FIG. 1, a risk of roll-over due to high friction is shown. A lateral force on the body of the vehicle (arrow 1) is directed opposed to a lateral force on tires (arrow 2) of the vehicle. In the center picture of FIG. 1, a risk of roll-over due to loose ground is depicted. In the right picture of FIG. 1 a Roll-over risk due to encountering a curb edge is depicted.

It is a well-known practice to change (reduce) the lateral forces on the tires as a solution of preventing roll over. There are already ESC systems (ESC in the sense of this invention is used as an abbreviation for any kind of Electronic Stability Control via brake actuation) known in the art which use brake interventions to "brake away" the lateral force, based on the fact that the resulting friction force in the road/tire contact patch is limited by a friction circle (also known as Kamm'scher Kreis). However, roll-over mitigation by brake interventions cannot avoid rollover for all critical situations.

One of the typical shortfalls of ESC brake interventions systems are they cannot change the lateral force more than reducing it down to zero. Additionally, they cannot brake away the lateral force if it comes from an edge or loose ground. Another shortcoming is the fact that braking can induce a bouncing mode of the whole vehicle, which causes problems for the driver to handle the vehicle shortly after the intervention.

It would, therefore be desirable to provide an improved method for reducing a roll-over event of a vehicle having an electronic controllable steering system (ECS) and an Electronic Control Unit (ECU).

SUMMARY

Therefore the purpose of the invention to overcome the above mentioned disadvantages whereby the risk for a Roll-over of the vehicle is mitigated respectively to prevent a vehicle from rolling over.

The invention comprises a method for reducing a risk of or avoiding a roll-over event of a vehicle. The vehicle comprising an electronic controllable steering system and an electronic control unit. First, the electronic control unit identifies the occurrence of the roll-over risk. Second, the electronic control unit generates a signal for the electronic controllable steering system in order to steer the road wheels more into the direction in which the vehicle is tending to roll-over.

The electronic control unit identifies the occurrence of a roll-over risk or roll-over probability, so that it can generate an advantageous signal in order to steer the road wheels more in the direction in which the vehicle is tending to roll-over. This serves to inhibit the driver from steering away from the Roll-over direction.

Preferably, the control algorithm is split into passive and active control components.

In one embodiment (e.g., using a passive approach via steering torque control) a torque assist from the electronic controllable steering system is reduced to force the driver to keep a steering wheel velocity below a certain value. A preferred execution of this kind of control is by continuously changing damping coefficients defining a delta steering torque.

In another embodiment, (e.g., using a passive approach via steering angle control) a steering velocity is limited, whereby the electronic controllable steering system offsets a steering wheel angle of the driver in case it exceeds a defined velocity at the road wheels. Preferably, the electronic control unit determines an actual steering wheel velocity and the corresponding road wheel velocity generating the adoption of a variable gear ratio, whereby the electronic control unit evaluates a desired steering angle by means of input variables of the vehicle state.

In a third embodiment (e.g., using an active approach via steering torque control) the electronic control unit evaluates a delta assist torque which at least guides the driver to apply the correct steering angle.

In a fourth embodiment (e.g., using an active approach via steering angle control) the electronic control unit generates a difference steering angle in addition to the driver's steering angle in order to actively generate a corrective steering action.

To overcome the prior art's disadvantages, the intention of this invention is to mitigate the risk of provoking a roll-over event to prevent a vehicle from rolling over by utilizing an electronic controllable steering system ECS instead of a purely brake based approach. Using steering instead of braking solves the three problems above because steering can guide the vehicle out of grooves in loose ground and over edges.

Additionally, the bounce mode is avoided since pitch is not induced into the system. Hence, the preferred solution is to steer road wheels more in the direction in which the vehicle is tending to roll-over, which is to the right as depicted exemplarily in FIG. 1, or reduce the opportunity for the driver to steer left.

Other advantages and features of the present invention will become apparent when viewed in light of the detailed description of the preferred embodiment when taken in conjunction with the attached drawings and appended claims.

DETAILED DESCRIPTION

In the following figures the same reference numerals will be used to illustrate the same components.

Before a roll-over can be compensated, it is, for some of the below explained control algorithms, necessary to identify the occurrence of a roll-over risk. The easiest way to identify the risk to roll-over is to have a look at the statically force equation as described in FIG. 2.

Figure 2:
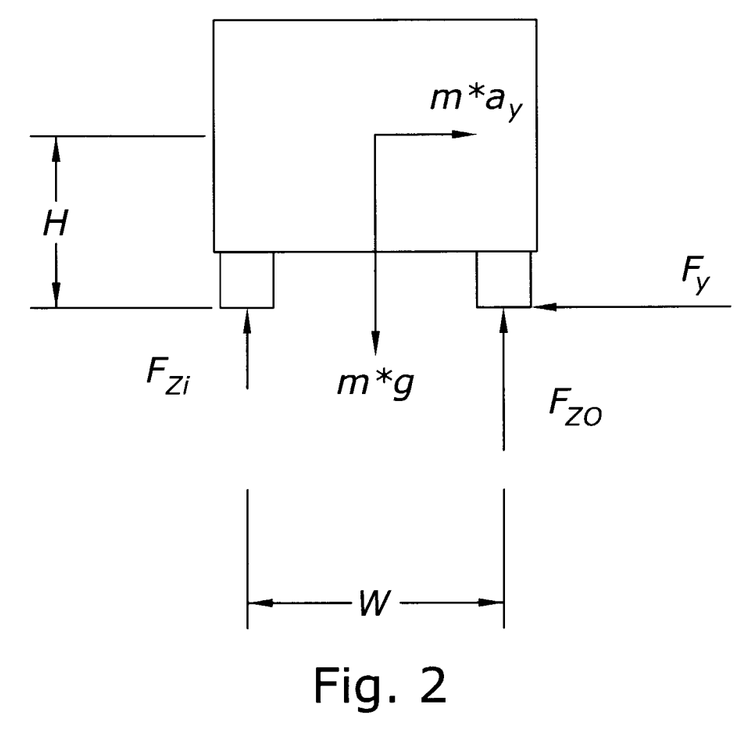
FIG. 2 is a diagrammatic representation of the forces in a rollover.

As FIG. 2 shows, common for all Roll-over situations is the following reasoning:

Roll-over starts if:

$$F_y > F_{y,crit}$$

with $F_{y,crit} = W \cdot m \cdot g / (2 \cdot H)$

Since $F_y = F_{yf} + F_{yr}$ (front and rear) the criteria for all Roll-over can be formulated as follows Roll-Over starts if:

$$F_{yf} > F_{yf,crit}$$

with $F_{yf,crit} = W \cdot m \cdot g / (2 \cdot H) - F_{yr}$

Moreover road banking, elastic energy in suspension etc. can be included in the expression for/calculation of $F_{yf,crit}$.

The rolling torque induced in the vehicle by the lateral acceleration may not exceed a value defined by height the H of the center of gravity, (CoG), vehicle mass, m, and track width, W. This equation does not consider dynamic maneuvers nor any influence from the suspension design, e.g. the roll axle.

The control part basically splits into a passive and an active control algorithm approach. The passive approach reduces the risk of a roll-over via ECS by preventing the driver from giving too much steering amplitude to the vehicle. The control only (re-)acts depending on the actual driver input.

The active control approach analyzes the driving situation in more detail and influences the lateral forces in a way to overcome the roll-over.

Depending on the approach, different roll-over maneuvers can be addressed. Combined with the two basic ways of steering control—angle control and torque control—, four different solutions have to be differentiated. Ultimately, which algorithm or a combination of these approaches will be implemented depends on the available hardware in a vehicle and is subject to the desired customer functionality.

Figure 3:
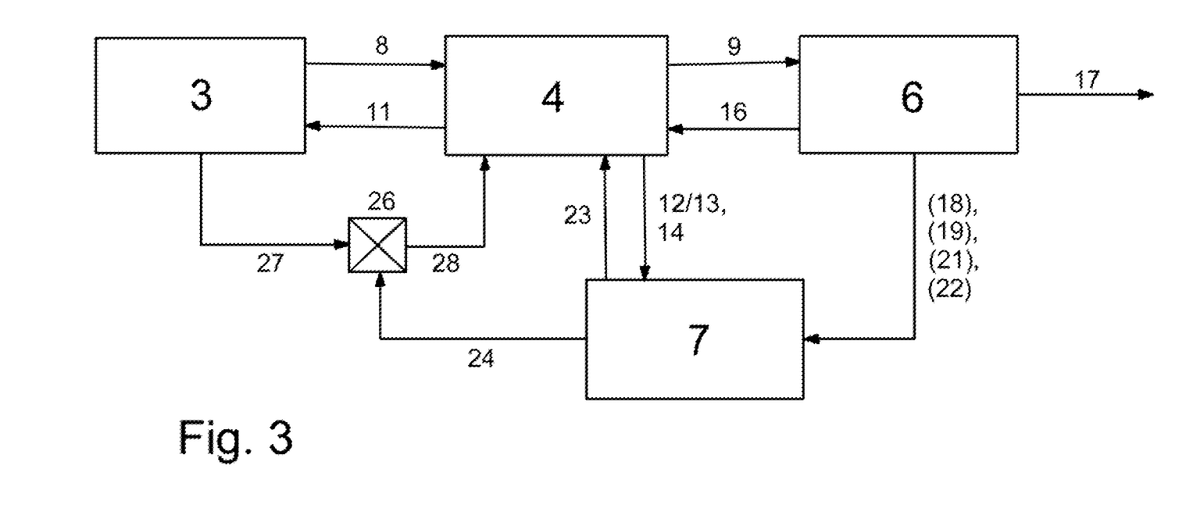
FIG. 3 is a diagram of the present invention using a passive approach and steering torque control.

FIG. 3 shows the passive approach steering torque control. Block 3 represents the driver. Block 4 represents the steering system, exemplarily an EPAS (Electronic Power Assisted Steering). Block 6 represents the vehicle. Block 7 represents the Electronic control unit (ECU).

The driver 3 inputs a steering angle signal 8 to the EPAS 4. The EPAS 4 transforms the steering position via the steering ratio into a rack position signal 9 in the vehicle, a torque signal 11 and a steering angle signal 12, a steering velocity signal 13 and a torque assist signal 14. The rack position signal 9 is fed into the vehicle Block 6, whereby a rack force signal 16 is generated and sent to the EPAS 4. The vehicle Block 6 generates a roll motion signal 17. Vehicle state signals such as vehicle speed 18, lateral acceleration 19, yaw rate 21 and longitudinal acceleration 22 are send to the ECU. These signals are not necessary for the approach depicted in FIG. 3, but if available, are of use to improve the algorithm. Therefore the reference numbers are written in brackets in FIG. 3 (and FIG. 4). The EPAS sends the signals 12, 13 and 14 to the ECU which calculates a max. steering velocity signal 23 and a damping coefficient signal 24. The signal 23 is sent to the EPAS. The signal 24 is sent to an interface 26, which receives steering velocity signal 27 from the driver 3 generating a delta torque assist signal 28 which is also sent to the EPAS.

The approach reduces the risk of a roll-over by preventing the driver from increasing the steering wheel velocity $v_{Steer}$ above a certain value/limit. This value $v_{Steer,max}$ is variable and depends on certain input variables which characterize the actual driving situation, e.g. vehicle speed over ground, longitudinal acceleration, lateral acceleration and yaw rate as well as the road friction level µ (FIG. 3).

Additionally, the steering frequency and actual assist level do influence the value of $v_{Steer,max}$. In case the algorithm in the ECU detects a driving situation which could yield a roll-over situation (FIG. 1), the torque assist from the controllable steering system is reduced or even reversed to force the driver to keep the steering wheel velocity below the calculated max. value.

Even if there is no reliable and precise opportunity to identify the existence of a roll-over risk (no availability of vehicle speed over ground and/or longitudinal acceleration and/or lateral acceleration and/or yaw rate), the intervention of the controllable steering could be allowed, as it would not reduce the usual driving functionality of the vehicle from a driver perspective ($v_{Steer,max}$ is above the typical steering wheel velocities a driver utilizes and would only be exceeded in limit handling situations).

The control is executed by means of a continuously changing damping coefficient d(t), which defines the delta steering torque $$\Delta T_{Steer} = d(t) \cdot v_{Steer},$$

which is added to or subtracted from the steering torque defined by the usual assist control concept.

This change of the assist torque would prevent a growing lateral acceleration and decreases the risk of a vehicle roll-over in a smooth way without distracting the driver by harsh steering interventions.

The control reacts to the driver's input. As soon as the steering velocity vSteer decreases the intervention decreases as well by means of delta steering torque. If the driving situation is no longer endangering roll-over, the damping coefficient d(t) is reduced smoothly which results also into an additional decreasing intervention $\Delta T_{Steer}$.

In case of roll-over induced by an edge or loose ground this approach (FIG. 3) can not provide an assistance, as it only reacts to the drivers steering input and does not actively counter-steer.

Figure 4:
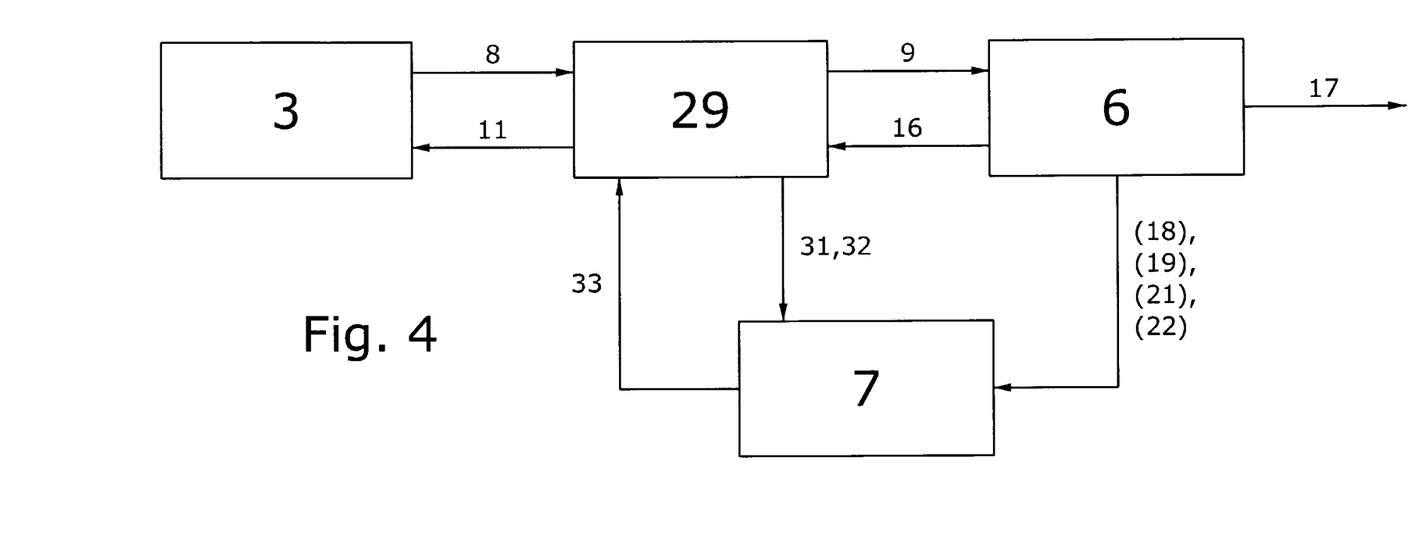
FIG. 4 is a diagram of the present invention using a passive approach and steering angle control.

In FIG. 4 a passive approach utilizing steering angle torque is exemplary depicted, whereby the same signals have same reference numbers as well as blocks, as it has been introduced in FIG. 3 already.

Instead of the exemplary shown EPAS 4 in FIG. 3, FIG. 4 shows an Active Front Steering plus Assist Block 29 (AFS).

Different than what is shown in FIG. 3, the AFS 29 generates a steering velocity signal 31 and a variable gear ratio (VGR) signal 32 is sent to the ECU 7. The ECU 7 generates a delta variable gear ratio signal 33 and forwards it to the AFS 29.

The approach depicted in FIG. 4 follows a strategy similar to the one shown in FIG. 3 and reduces the risk of roll-over by limiting the steering velocity. In this approach, an actuator for angle overlay is utilized (FIG. 4), and the control law in fact limits the road wheel steering velocity to wSteer,max, even if the driver attempts to input a higher steering wheel velocity.

The detection for roll-over is the same as depicted in FIG. 3, but the control will offset the steering wheel angle of the driver in case it exceeds the defined velocity for the road wheels.

Assuming that the AFS implements a VGR (variable gear ratio) functionality, the control law basically utilizes the actual steering wheel velocity $v_{steer}(t)$ and the corresponding road wheel velocity $w_{Steer}(t)=VGR(t)\cdot v_{Steer}(t)$ to calculate the reduction of the variable gear ratio $\Delta VGR(t)$:

$$\Delta VGR(t)=(VGR(t)\cdot v_{Steer}(t)-w_{Steer,max})/v_{Steer}(t)$$

As indicated in FIG. 4, the reduction calculated in the ECU is then fed back into the steering system and subtracted from the actual selected VGR(t). The VGR(t) usually is defined by a look-up table and usually depends on vehicle speed and steering wheel input. Nevertheless, the approach described here can handle any variation of the VGR over time.

Instead of the VGR approach, an additional delta steering wheel angle or delta road wheel angle can be applied. The algorithm works then in the same manner to the VGR case with adopted output signal.

Figure 5:
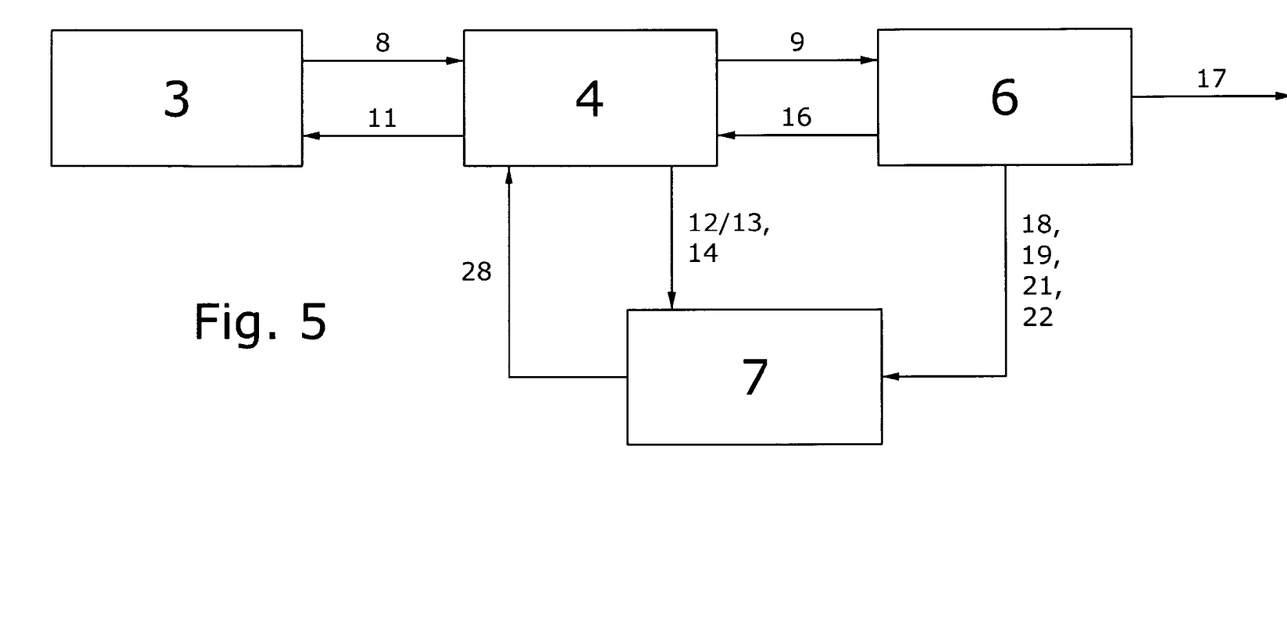
FIG. 5 is a diagram of the present invention using an active approach and steering torque control.

FIG. 5 shows an example of an active approach of steering torque control, whereby same signals as well as blocks have the same reference numbers, so that these are not described in more detail.

The exemplary approach shown in FIG. 5 guides the driver "actively" to do the right steering maneuver to minimize the risk of a roll-over. The desired steering angle sSteer,ref(t) to prevent or overcome a roll-over risk is calculated by means of the input variables vehicle speed 18 over ground, longitudinal acceleration 22, lateral acceleration 19 and yaw rate 21.

Based on the difference between the actual measured driver steering input (steering wheel angle, steering wheel velocity) and the desired steering angle and the actual torque assist level, a delta assist torque 28 is computed, which guides or even forces the driver to apply the correct steering angle (FIG. 5). If the driver rejects the torque assistance by not steering in the desired direction the delta assist torque 28 can be increased up to a certain upper level for the resulting torque assist. Above that upper bound no further assist interaction may occur, so that the driver has the opportunity to overrule the steering request/guidance.

This approach could provide roll-over prevention in standard driving situations and also on certain ground conditions like loose ground or edges.

Figure 6:
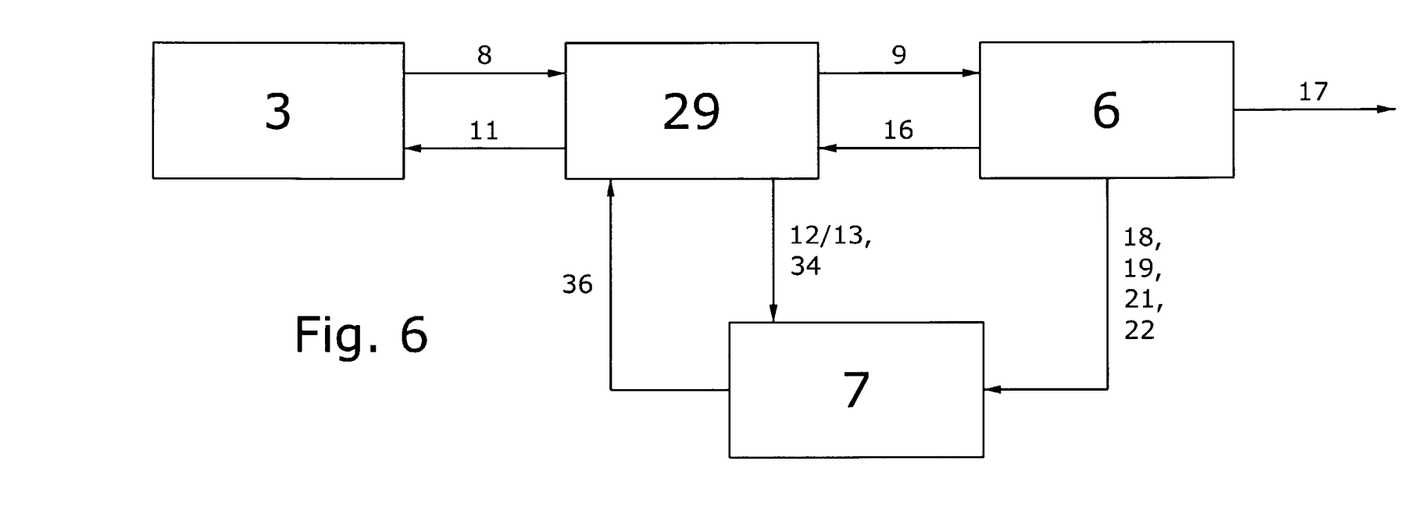
FIG. 6 is a diagram of the present invention using an active approach and steering angle control.

FIG. 6 shows an example of an active approach of steering angle control, whereby the same signals as well as blocks have the same reference numbers. The signals 12, 13 and a road wheel angle signal 34 is send to the ECU 7, which generates a delta steering wheel angle signal 36 forwarding it to the AFS 29.

The exemplary approach shown in FIG. 6 utilizes steering position control. The road wheels can be turned without turning the hand wheel, as it is possible e.g. in the case of AFS. Hence, the control law can basically force the road wheels to follow the desired road wheel position calculated from the desired steering angle sSteer,ref(t) defined in the example of FIG. 5. Similar to the case depicted in FIG. 5, the same input variables are used to calculate sSteer,ref(t).

If the driver induced road wheel angle differs from the desired road wheel angle the AFS actuator generates an additional difference steering angle to the driver's steering angle in order to reduce the roll-over risk, i.e. actively generate the corrective steering action (FIG. 6).

This approach could provide roll-over prevention in standard driving situations and also on certain ground conditions like loose ground or edges.

Figure 7:
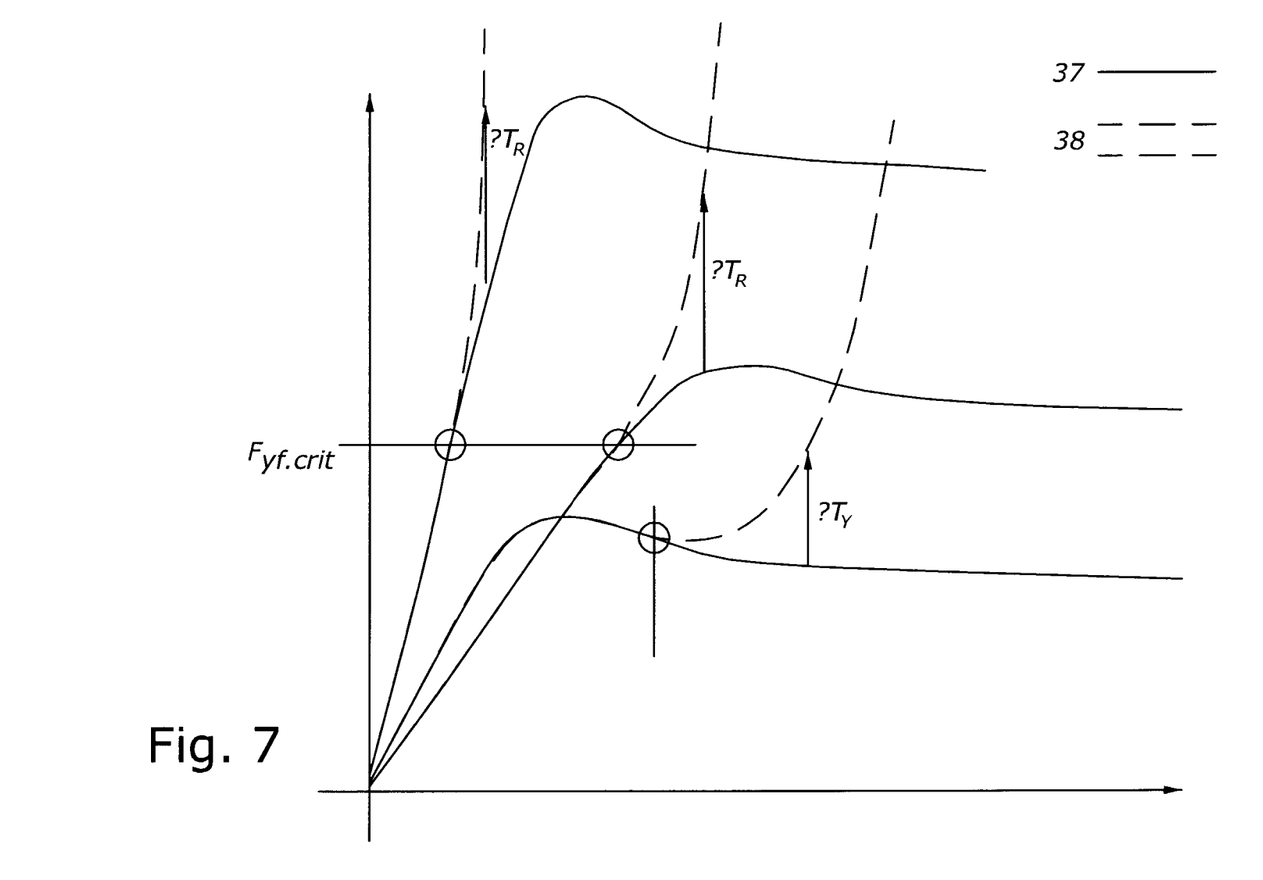
FIG. 7 is a diagram of the present invention avoiding a roll-over and using yaw resistance.

When applying one of the approaches or a combination of these depicted in FIGS. 3 to 6, an integration with yaw stability control by steering is favorable. One simple and straight forward way in doing so, is to utilize the concept of "coexistence". That is possible due to the fact that roll-over and yaw stability interventions act in different driving situations (FIG. 7). Roll-over intervention happens when a certain force is exceeded. Yaw intervention happens, in principle, when a certain slip angle is exceeded (e.g. implemented as a certain delta angle calculated from the side slip angle where the peak force was detected).

In FIG. 7 the solid lined graphs 37 represent a lateral force on front axle $F_{yf}$, whereby the dotted lines 38 represent the steering wheel torque, drawn with a scale such that this is equal to the lateral force when no stability control assistance is active. The term $?T_R$ represents the additional steering wheel torque for Roll-over assistance, whereby the term $?T_y$ represents the additional steering wheel torque for yaw rate assistance. The x-coordinate represents the wheel slip angle $?_f$ which is the same as steering wheel angle—$V_{yf}/V_x$. In the Diagram of FIG. 7 the term $?T_R$ and $?T_y$ have the meaning of deltaT$_R$ and deltaT$_y$ ($\Delta T_R$; $\Delta T_y$), whereby the term $?_f$ has the meaning of $\alpha_f$.

While particular embodiments of the invention have been shown and described, numerous variations and alternate embodiments will occur to those skilled in the art. Accordingly, it is intended that the invention be limited only in terms of the appended claims.

What is claimed is:

1. A method for reducing a risk of or avoiding a roll-over event of a vehicle having an electronic controllable steering system and an electronic control unit, the method comprising the steps of:

the electronic control unit identifying an occurrence of the roll-over risk; the electronic control unit determining an actual steering wheel velocity and a corresponding road wheel velocity;

the electronic control unit generating a control signal for the electronic controllable steering system in order to steer the road wheels more into the direction in which the vehicle is tending to roll-over, the control signal including a corrective road wheel angle that is based on a difference between the actual steering wheel velocity and the corresponding road wheel velocity;

the electronic control unit applying the generated control signal to the electronic controllable steering system in response to a driver input thereby limiting the driver input to a predetermined steering input; and the electronic control unit applying the generated control signal to the electronic controllable steering system in response to a driving situation influenced by vehicle lateral forces.

2. A method as claimed in claim 1 further comprising the electronic controllable steering system having a steering wheel velocity and a torque assist wherein, the application of the generated control signal reduces the torque assist to force the driver to keep the steering wheel velocity below a certain value.

3. A method as claimed in claim 1, wherein the application of the generated control signal is executed by means of a continuously changing damping coefficient defining a delta steering torque.

4. A method as claimed in claim 3, further comprising the electronic controllable steering system having a steering wheel angle and a steering velocity, wherein the application of the generated control signal limits the steering velocity and offsets the steering wheel angle input by the driver when the steering wheel angle input by the driver exceeds either a predefined road wheel velocity or a predefined steering velocity defined velocity at road wheels or a defined steering velocity.

5. A method of claim 4, wherein the step of generating the control signal further comprises:
   determining an actual steering wheel velocity;
   determining a corresponding road wheel velocity; and
   the application of the generated control signal generates a reduction of variable gear ratio.

6. A method of claim 1, wherein the step of generating the control signal further comprises the electronic control unit evaluating a desired steering angle by means of input variables of vehicle state.

7. A method of claim 1, wherein the step of generating the control signal further composes the electronic control unit evaluating a delta assist torque which is applied by the electronic control unit and guides the driver to apply predetermined steering angle that will prevent or overcome a roll-over risk.

8. A method of claim 1, wherein the step of generating the signal further comprises the electronic control unit generating a corrective steering angle that is applied in addition to the driver's steering angle in order to actively generate a corrective steering action.

9. A method for reducing a risk of or avoiding a roll-over event of a vehicle having an electronic controllable steering system and an electronic control unit, the method comprising the steps of:
   the electronic control unit identifying an occurrence of the roll-over risk; the electronic control unit determining an actual steering wheel velocity and a corresponding road wheel velocity;
   the electronic control unit generating a control signal for the electronic controllable steering system in order to steer the road wheels more into the direction in which the vehicle is tending to roll-over, the control signal including a corrective steering wheel angle that is based on a difference between the actual steering wheel velocity and the corresponding road wheel velocity;
   the electronic control unit applying the generated control signal to the electronic controllable steering system in response to a driver input and limits the driver input to a predetermined steering input; and
   the electronic control unit applying the generated control signal to the electronic controllable steering system in response to a driving situation influenced by vehicle lateral forces.

10. A method as claimed in claim 9 further comprising the electronic controllable steering system having a steering wheel velocity and a torque assist wherein, the application of the generated control signal reduces the torque assist to force the driver to keep the steering wheel velocity below a certain value.

11. A method as claimed in claim 9, wherein the application of the generated control signal is executed by means of a continuously changing damping coefficient defining a delta steering torque.

12. A method as claimed in claim 11, further comprising the electronic controllable steering system having a steering wheel angle and a steering velocity, wherein the application of the generated control signal limits the steering velocity and offsets the steering wheel angle input by the driver when the steering wheel angle input by the driver exceeds either a predefined road wheel velocity or a predefined steering velocity defined velocity at road wheels or a defined steering velocity.

13. A method of claim 12, wherein the step of generating the control signal further comprises:
   determining an actual steering wheel velocity;
   determining a corresponding road wheel velocity; and
   the application of the generated control signal generates a reduction of variable gear ratio.

14. A method of claim 9, wherein the step of generating the control signal further comprises the electronic control unit evaluating a desired steering angle by means of input variables of vehicle state.

15. A method of claim 9, wherein the step of generating the control signal further comprises the electronic control unit evaluating a delta assist torque which is applied by the electronic control unit and guides the driver to apply a predetermined steering angle that will prevent or overcome a roll-over risk.

16. A method of claim 9, wherein the generated signal further comprises the electronic control unit generating a corrective steering angle that is applied in addition to the driver's steering angle in order to actively generate a corrective steering action.

* * * * *